United States Patent Office 3,138,622
Patented June 23, 1964

3,138,622
5α-CHLORO-17α-ETHYNYL-19-NOR - ANDROSTAN-17β-OL-3-ONE AND METHOD OF PREPARATION
Jose Iriarte, Mexico City, Mexico, assignor, by mesne assignments, to Syntex Corporation, a corporation of Panama
No Drawing. Filed Mar. 23, 1962, Ser. No. 182,124
Claims priority, application Mexico Sept. 12, 1961
6 Claims. (Cl. 260—397.4)

The present invention relates to a new cyclopentanophenanthrene derivative and to a process for the preparation thereof.

More specifically, the present invention relates to 5α-chloro-17α-ethynyl-19-nor-androstan-17β-ol-3-one and to a method for the preparation of the same.

The compound object of the present invention is represented by the following formula:

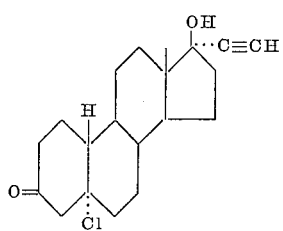

The compound represented by the above formula is a progestational and anti-ovulatory agent, useful in fertility control. Furthermore, it is an anti-estrogenic agent, inhibits the production of gonadotrophins and lowers the cholesterol level in the blood, adrenal glands and liver. It is also useful in the treatment of premenstrual stress.

The new compound is prepared by the process illustrated by the following equation:

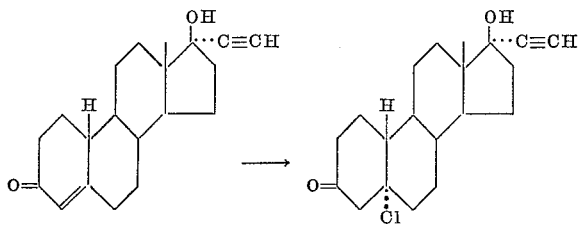

In practicing the process outlined above, the starting compound 17α-ethynyl-19-nor-testosterone (I), is dissolved in a small quantity of a polar solvent inert to the action of dry hydrogen chloride, such as chloroform, methylene chloride, dioxane, etc., and treated with a stream of the aforementioned reagent, or with a solution of the same in a solvent of the type set forth above, thus producing 5α-chloro-17α-ethynyl-19-nor-androstan-17β-ol-3-one (II). To those skilled in the art it is obvious that the dry hydrogen chloride or its solutions may be substituted by compounds which generate it in situ, such as for example, phosgene in the presence of moisture.

The following specific examples serve to illustrate the invention, but are not intended to limit its scope:

*Example I*

A solution of 17α-ethynyl-19-nor-testosterone in 150 cc. of chloroform was cooled to 5° C. in an ice bath and then a stream of dry hydrogen chloride was introduced into the solution for 30 minutes. The precipitate formed was collected by filtration and washed with chloroform. The crude material thus obtained showed a melting point of 198–204° C. After recrystallizing the crude product from a large volume of chloroform, there was obtained 5α-chloro-17α-ethynyl-19-nor-androstan-17β-ol-3-one in pure form, with M.P. 213–214° C. (dec.); $[\alpha]_D$ —24° (dioxane).

*Example II*

By following the process of the preceding example, but using methylene chloride instead of chloroform, there was obtained 5α-chloro-17α-ethynyl-19-nor-androstan-17β-ol-3-one, identical with the produce of the preceding example.

*Example III*

By the process described in Example I, but substituting the chloroform by dioxane, there was obtained the desired compound, which exhibited the same physical constants.

*Example IV*

By following the process of Example III, except that the dry hydrogen chloride was substituted by 10 cc. of a concentrated solution of the same in dioxane, there was obtained 5α-chloro-17α-ethynyl-19-nor-androstan-17β-ol-3-one.

*Example V*

By following the method of Example I, but substituting the dry hydrogen chloride by a chloroform solution of the same, there was obtained the desired compound.

*Example VI*

17α-ethynyl-19-nor-testosterone was treated in accordance with Example I, except that the dry hydrogen chloride was substituted by phosgene, thus affording 5α-chloro-17α-ethynyl-19-nor-androstan-17β-ol-3-one.

I claim:
1. A process for preparing 5α-chloro-17α-ethynyl-19-nor-androstan-17β-ol-3-one which comprises reacting 17α-ethynyl-19-nor-testosterone in a polar organic solvent with dry hydrogen chloride.
2. The process of claim 1 wherein the solvent is chloroform.
3. The process of claim 1 wherein the solvent is methylene chloride.
4. The process of claim 1 wherein the solvent is dioxane.
5. The process of claim 1 wherein the hydrogen chloride is generated in situ by phosgene.
6. 5α-chloro-17α-ethynyl - 19 - nor-androstan-17β-ol-3-one.

References Cited in the file of this patent
UNITED STATES PATENTS
2,430,988     Marker et al. _____ Nov. 18, 1947
3,030,389     Julian et al. _____ Apr. 7, 1962

OTHER REFERENCES
Knox et al.: J.A.C.S. 82, 1960, pages 230–235.